Figure 1:
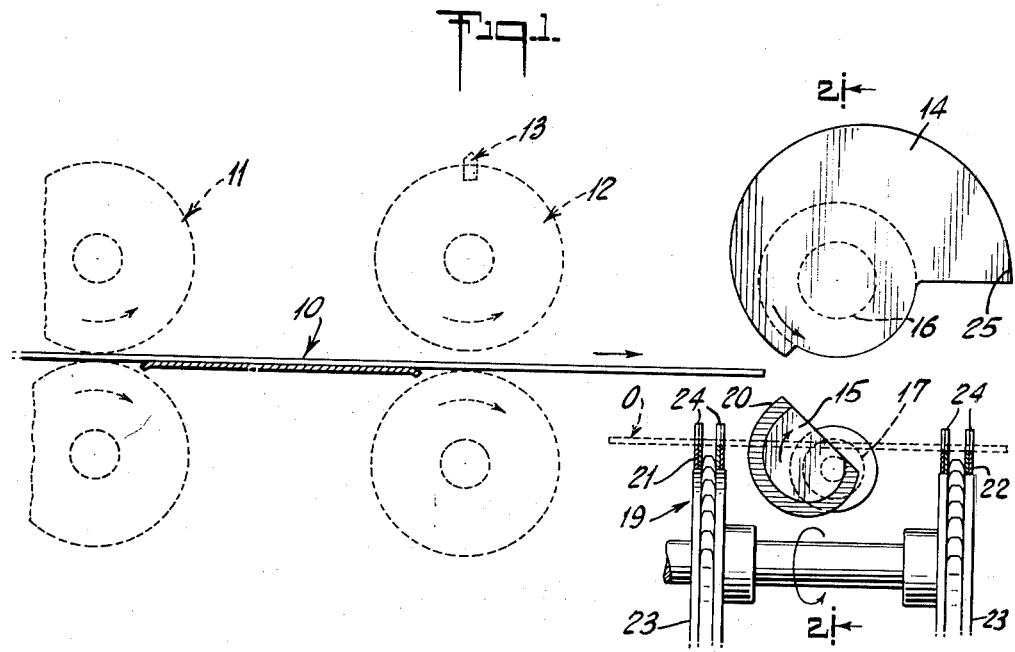

Jan. 1, 1952     M. A. SCHWARTZ     2,580,469
CAM DEVICE FOR VARYING SPEED OF AN OBJECT
Filed June 1, 1950     3 Sheets-Sheet 1

INVENTOR.
MORRIS A. SCHWARTZ.
BY
ATTORNEY

Jan. 1, 1952  M. A. SCHWARTZ  2,580,469
CAM DEVICE FOR VARYING SPEED OF AN OBJECT
Filed June 1, 1950  3 Sheets-Sheet 2
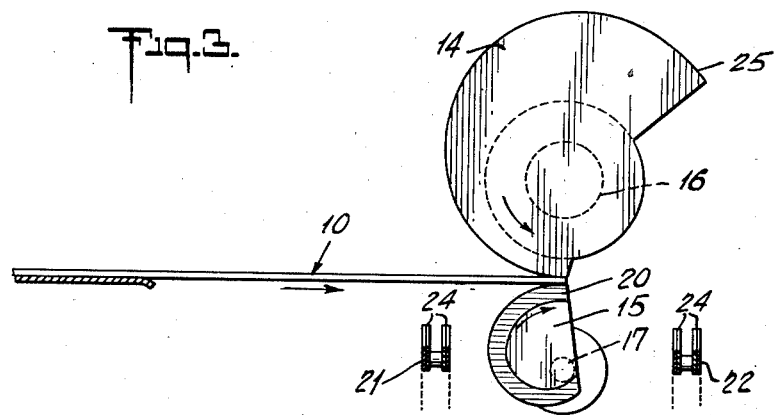
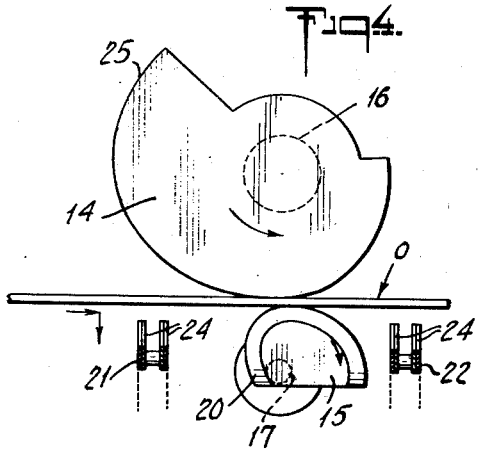
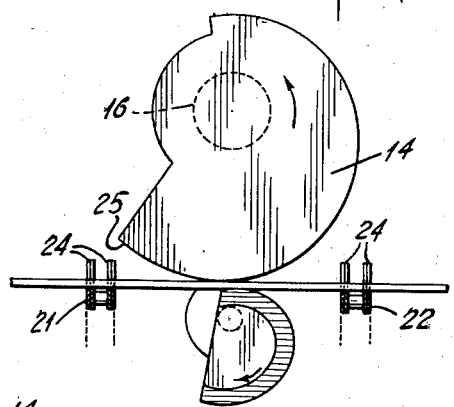
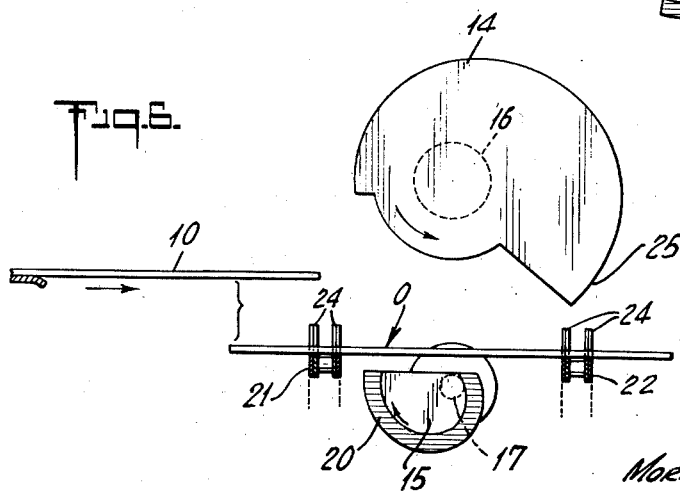
INVENTOR.
MORRIS A. SCHWARTZ.
BY
Andrea L. Norfolk
ATTORNEY Jan. 1, 1952 — M. A. SCHWARTZ — 2,580,469
CAM DEVICE FOR VARYING SPEED OF AN OBJECT
Filed June 1, 1950
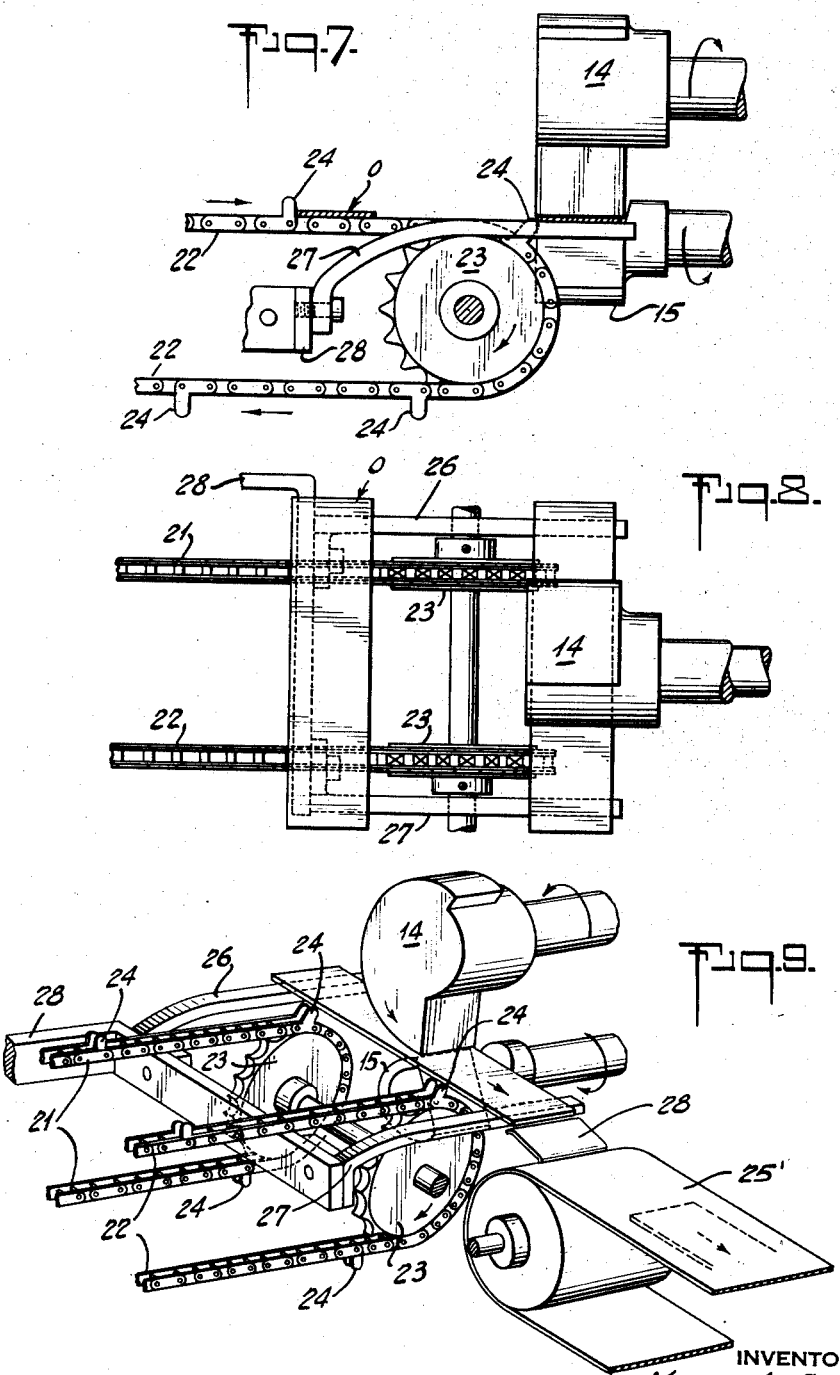
INVENTOR
MORRIS A. SCHWARTZ
BY
Arnold S. Worfolk
ATTORNEY Patented Jan. 1, 1952

2,580,469

UNITED STATES PATENT OFFICE 2,580,469

CAM DEVICE FOR VARYING SPEED OF AN OBJECT

Morris A. Schwartz, North Plainfield, N. J., assignor to Johnson & Johnson, a corporation of New Jersey Application June 1, 1950, Serial No. 165,510

11 Claims. (Cl. 198—20)

1

This invention relates to a cam device for accelerating or decelerating an object, respectively, from low speed or condition of rest to relatively high speed, or from relatively high speed to low speed or condition of rest.

The device comprises a pair of mating edge cams whose active surfaces for any given subtended angle, increase in radius to the same extent and which are arranged to rotate in opposite directions but at the same angular velocity. Preferably the cams have involute surfaces generated from the same base circle. The cams have their peripheral or mating surfaces spaced according to the thickness of the object whose speed is to be varied and to insure that one cam holds the object constantly in engagement with the surface of the other cam. The cam surfaces have different coefficients of friction depending upon whether the object is to decelerate or accelerate. If deceleration is desired, the cam which presents to the object a surface of progressively decreasing radius has such surface of a higher coefficient of friction than the surface of the other cam. The cam of higher coefficient of friction is the control cam. It engages the object where its surface has its greatest radius. As it rotates, at constant angular velocity, its diminishing peripheral speed, at point of contact with the object, due to its diminishing radius brings about a corresponding decrease in the speed of travel of the object. The surface of the other cam has a lower coefficient of friction. It slides along the object and holds it in contact with the surface of the control cam but it has no effect upon the speed of the object even though its peripheral speed at point of contact with the object progressively increases.

On the other hand, if the object is to be accelerated, the surface of the cam which increases in radius as it progressively engages the object has the higher coefficient of friction and is the control cam. The object engages between the cams where the effective radius of the control cam is smallest and that of the holding cam, the largest. As the cams rotate, the increasing peripheral speed of the control cam at point of contact with the object, due to its increasing radius, imparts such increasing speed to the object. As in the previous case, the surface of the holding cam merely slides along the surface of the object without effect upon its speed.

The invention has been illustrated in connection with a mechanism for decelerating and accelerating flat objects.

In the drawings:

Fig. 1 is a partly schematic front elevation, of

Figure 2:
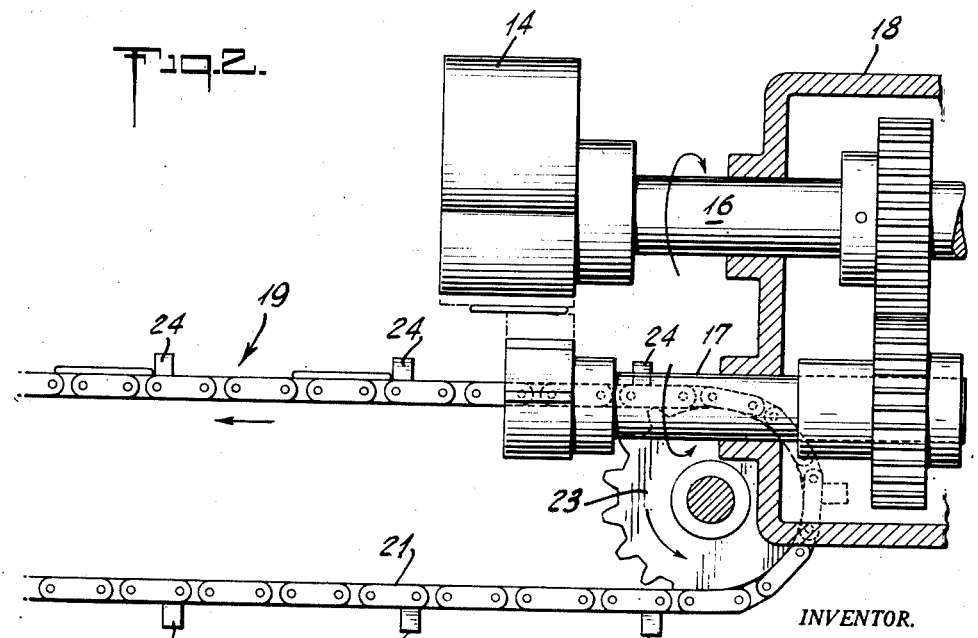

2 a mechanism for decelerating an object and which comprises the improved cam device;

Fig. 2 is a sectional view on line 2—2 of Fig. 1;

Figs. 3, 4, 5, and 6 are schematic views showing the cams at different positions in the machine cycle;

Fig. 7 is a side elevation of a portion of a mechanism for accelerating an object and which comprises the improved cam device; and Figs. 8 and 9 are respectively a top plan view and a perspective view of the mechanisms shown in Fig. 7.

Referring to the drawings, a continuous strip of material 10 is driven by a pair of feed rolls 11 which act upon the top and bottom surfaces of the strip to feed it along between a pair of rolls 12 designed to cut the strip into predetermined lengths.

The feed rolls 11 and the cutting rolls 12 are mounted on parallel drive shafts, one each of the feed and of the cutting rolls being above and the other below the traveling strip (Fig. 1). One of the rolls 12 (the upper one shown in the drawing) is equipped with a transverse cutting blade 13, recessed into the peripheral surface of the roll, and which, during each rotation of the roll, cooperates with the hardened surface of the underlying roll to effect the cutting operation.

Just before each cutting operation, the leading end of the strip 10 passes between the peripheral surfaces of a pair of mating edge cams 14 and 15, mounted one above the other on parallel shafts 16 and 17, rotatably mounted in bearings presented by a gear housing 18, supported on a fixed part of the machine. The upper shaft 16 is connected to a suitable drive (not shown) and is geared to the lower shaft 17 to effect drive of the cams 14 and 15 at the same angular velocity but in opposite directions.

The edge cams 14 and 15 are so spaced apart that the strip 10 is gripped by the cams when its leading end passes between them (Fig. 3). Immediately thereafter, a portion is cut off from the leading end of the strip by operation of the cutting rolls 12, forming an object O which is decelerated from the relatively high speed of the traveling strip to zero speed in the direction of strip travel for transfer to a conveyor 19 traveling at right angles to the strip. The underlying cam 15 controls deceleration of the object. For this purpose, it is provided with a surface 20, having a high coefficient of friction, such as rubber, which imparts to an object held against it, the same speed as that portion of the cam's surface which engages the object at any particular instant.

The lower cam 15 rotates in a clockwise direction, looking at Figs. 1 and 3. It is so located that when that portion of the cam's surface which has the greatest radius is at the high point of the cam's rotation, it is also at the same level as the under surface of the strip 10 as the latter travels along under the influence of the feed rolls 11. By properly coordinating the speed of rotation of the cam 15 and the speed of the traveling strip 10, by interconnecting gearing or chain drive (not shown) between the cam drive and the rolls 11 and 12, the leading end of the strip can be moved to engage the cam at its point of greatest radius at a speed corresponding to the peripheral speed of the cam at that point.

At the same instant that the point of greatest radius of the underlying cam 15 engages the under surface of the strip 10, the point of smallest radius of the overlying cam 14 engages the strip at a corresponding position on its top surface (Fig. 3). Immediately thereafter, the strip is severed producing the object O as previously stated.

As the underlying cam 15 rotates from its initial position where it takes over control of the object, it presents to the object O a surface of gradually decreasing radius; whereas the overlying cam 14 presents a surface of correspondingly increasing radius. The object thus is held by the large cam 14 in contact with the friction surface of the lower cam 15. Consequently, it moves at the same speed as that portion of the surface of the smaller cam which engages it at any time, i. e., at a constantly decreasing speed; and if the radius of the smaller cam becomes zero, the component of speed of the object in its initial direction of travel likewise becomes zero.

The surface of the larger overlying cam 14 in contact with the object gradually increases in peripheral speed; but since it has a relatively low coefficient of friction, it merely slides along the object O while holding it in contact with the underlying control cam 15. An intermediate position of the object O during deceleration is shown in Fig. 4.

As previously stated, the upper and the lower cams 14 and 15, respectively, increase and decrease in radius by corresponding increments with corresponding angular displacements of the cams as their surfaces move along in contact with the object. Any type of curved surface that will give this effect may be used. By way of example, and for purposes of illustration, the cams 14 and 15 shown in the drawings are formed with involute surfaces generated from the same base circle. Any portion of an involute surface thus generated may be used for the respective mating cams. It is preferred, however, that such portions of the involute be used as will provide for the cams peripheral surfaces having the same radius of curvature at the location where they initially and simultaneously engage the opposite surfaces of the object O whose speed is to be changed.

When the low portion of cam 15 arrives in contact with the object O, the speed of the latter has been decreased to an extent where it can be deposited on the conveyor 19 with relatively little or no shock. The conveyor 19 comprises a pair of parallel chains 21 and 22 spaced apart a distance sufficient to give stable support to the object when laid transversely on the conveyor. The chains 21, 22 are located at the same level, one at each side of the cam 15, are driven by sprocket wheels 23, and are equipped at corresponding and equally spaced intervals therealong with vertical posts 24, which engage the objects O as they are deposited by the cam mechanism. The spacing of the posts 24 along the conveyor and the speed of travel of the conveyor (whose sprocket drive may derive movement from the same source of power as the cam mechanism) is such that an object O is deposited by the cam mechanism onto the conveyor in advance of each pair of correspondingly located posts.

The object O is released by the underlying cam 15 as the latter continues its rotation, as soon as it is deposited in the conveyor 20 (Fig. 5). The overlying cam 14, however, is wider and has a trailing portion 25 which continues in contact with the object for a short period after it has been released by the underlying cam. This is to provide a slight drag to insure that the trailing edge of the object as it is carried by the conveyor is engaged by both of the appropriate posts 24. The objects thus will be evenly spaced along the chain. This drag is exerted by the cam 14 without bending the object O since the trailing portion of the cam 14 from the point where it ceases to cooperate with the surface of the cam 15 has a constant radius (Fig. 5). Further rotation of the cams 14 and 15 again brings them around to position for engaging the leading end of the traveling strip 10 which, in the meantime, is fed forward ready for the next cam cycle of operation (Fig. 6).

Figs. 7, 8 and 9 illustrate an embodiment of the invention in which an object O is accelerated from a position of rest to relatively high speed such as that of a traveling belt 26 on which the object may be carried away.

An endless sprocket driven conveyor similar to that in the embodiment previously described and comprising parallel chains 21, 22 having posts 24 at equally spaced intervals therealong conducts objects to and deposits them one at a time on a pair of parallel ways 26, 27 located one adjacent each of the parallel chains at the level at which the object is conveyed thereby.

The ways are fastened at one end to a horizontal bracket 28 fixed on the machine frame beneath the top section of the chain on which the objects are carried. The ways 26, 27 curve upwardly to the level of the top section of chain and then extend for a short distance beyond where the top section of chain curves downwardly around the sprocket wheel 23. The posts 24 engage the trailing edge of the object in moving it along but move free of engagement with the object O where the chains carry them around the sprockets 23 to leave the object resting on the extended ends of the ways 26, 27.

When the object O is resting on the extended ends of the ways it is in position to be engaged above and beneath by the pair of cams 14, 15 which may be the same in all respects as those in the embodiment previously described except that the larger cam at the top need not have an extended surface of constant radius.

As before, the cams 14, 15 are arranged for rotation in opposite directions but during their rotation the lower cam 15 engages the object O at its point of smallest radius whereas the upper cam 14 simultaneously therewith engages the object at its point of greatest radius. As before, the lower cam 15 has a surface of relatively high coefficient of friction as compared with the upper cam. As the cams rotate the peripheral speed of the surface of the lower cam is imparted to the object O. Consequently, when the lower cam has rotated to the position where its largest radius engages the object, the object has been accelerated in an endwise direction to a speed determined by such radius and the rate of rotation of the cam. The surface of the larger cam slides along the object and has no effect on it other than to hold it in engagement with the surface of the underlying cam.

The objects that have been accelerated by the cams may be carried off by the traveling belt 25' arranged in the path of movement of the objects as they leave the cams and traveling at the same rate of speed as that to which the objects have been accelerated. An intervening platform 28 which underlies the end of the objects as they initially rest on the ways and which bridges the intervening space to the traveling belt insures that the objects are transferred properly to the belt.

The invention, it will be observed, offers a relatively simple device for rapidly accelerating or decelerating objects and without shock. It has been described in connection with its preferred embodiments but many modifications are included within its spirit. It is to be limited therefore only by the scope of the appended claims.

What is claimed is:

1. A device for varying the speed of an object, comprising a pair of oppositely rotatable mating cams spaced apart in radial direction and arranged, as they rotate, to engage opposite faces of an object passing between them, one of said cams having a surface with progressively decreasing radius and of a given coefficient of friction, and the other a surface with correspondingly increasing radius and of a different coefficient of friction.

2. A device for varying the speed of an object, comprising a pair of oppositely rotatable mating cams spaced apart in radial direction and arranged, as they rotate, to engage opposite faces of an object passing between them, one of said cams having a surface with progressively decreasing radius for a given angle of cam rotation and of a given coefficient of friction, and the other a surface with correspondingly increasing radius for the same angle of cam rotation and of a different coefficient of friction.

3. A device for decelerating an object comprising a pair of oppositely rotatable mating cams spaced apart in radial direction and arranged, as they rotate, to engage opposite faces of an object passing between them, one of said cams having a surface with progressively decreasing radius for a given angle of cam rotation and of a given coefficient of friction and the other a surface with correspondingly increasing radius for the same angle of cam rotation and of a lower coefficient of friction.

4. A device for accelerating an object comprising a pair of oppositely rotatable mating cams spaced apart in radial direction and arranged, as they rotate, to engage opposite faces of an object passing between them, one of said cams having a surface with progressively increasing radius for a given angle of cam rotation and of a given coefficient of friction and the other a surface with correspondingly decreasing radius for the same angle of cam rotation and of a lower coefficient of friction.

5. A device for varying the speed of an object comprising a pair of oppositely rotatable involute cams having mating surfaces generated from the same base circle, said cams being spaced apart in radial direction and arranged, as they rotate, to engage opposite faces of an object passing between them, and having one, a surface of decreasing radius and of a given coefficient of friction, and the other, a surface of increasing radius and of a different coefficient of friction.

6. A device for decelerating the speed of an object, comprising a pair of oppositely rotatable involute cams having mating surfaces generated from the same base circle, said cams being spaced apart in radial direction and arranged, as they rotate, to engage opposite faces of an object passing between them, and having one, a surface of decreasing radius and of a given coefficient of friction, and the other, a surface of increasing radius and of a lower coefficient of friction.

7. A device for accelerating the speed of an object, comprising a pair of oppositely rotatable involute cams having mating surfaces generated from the same base circle, said cams being spaced apart in radial direction and arranged, as they rotate, to engage opposite faces of an object passing between them, and having one, a surface with increasing radius and a given coefficient of friction, and the other, a surface with decreasing radius and a lower coefficient of friction.

8. In combination, mechanism for varying the speed of an object comprising a pair of oppositely rotatable mating cams spaced apart in radial direction and arranged, as they rotate, to engage opposite faces of an object passing between them, and having one, a surface with progressively decreasing radius and a given coefficient of friction, and the other, a surface with correspondingly increasing radius and a different coefficient of friction, and means for automatically presenting an object between the cams at a given stage during the cam cycle of operation.

9. In combination, mechanism for varying the speed of an object comprising a pair of oppositely rotatable mating cams spaced apart in radial direction and arranged, as they rotate, to engage opposite faces of an object passing between them, and having one, a surface with progressively decreasing radius and a given coefficient of friction, and the other, a surface with correspondingly increasing radius and a different coefficient of friction, means for automatically presenting an object moving in one direction between the cams at a given stage in the cam cycle of operation, and means for receiving an object discharged from between the cams at a different stage in the cam cycle of operation and transporting said object in a different direction.

10. In combination, mechanism for decelerating the speed of an object, comprising a pair of oppositely rotatable involute cams having mating surfaces generated from the same base circle, said cams being spaced apart in radial direction and arranged, as they rotate, to engage opposite faces of an object passing between them, and having one, a surface of decreasing radius and of a given coefficient of friction, and the other, a surface of increasing radius and of a lower coefficient of friction, means for automatically presenting, in succession between the cams, objects traveling in one direction so as to be initially engaged by the cams at a stage in the cam cycle of operation where the surface of the cam of decreasing radius has a relatively large radius, and means for receiving objects discharged from between the cams at a stage in the cam cycle of operation where the surface of said cam of decreasing radius is of smaller radius and transporting said objects in a different direction.

11. In combination, mechanism for accelerating the speed of an object, comprising a pair of oppositely rotatable involute cams having mating surfaces generated from the same base circle, said cams being spaced apart in radial direction and arranged, as they rotate, to engage opposite faces of an object passing between them, and having one, a surface of increasing radius and of a given coefficient of friction, and the other, a surface of decreasing radius and of a lower coefficient of friction, means for automatically presenting, in succession between the cams, objects traveling in one direction so as to be initially engaged by the cams at a stage in the cam cycle of operation where the surface of the cam of increasing radius has a relatively small radius, and means for receiving objects discharged from between the cams at a stage in the cam cycle of operation where the surface of said cam of increasing radius is of larger radius and transporting said objects in a different direction.

MORRIS A. SCHWARTZ.

No references cited.